(12) United States Patent
Awata

(10) Patent No.: US 11,265,434 B2
(45) Date of Patent: Mar. 1, 2022

(54) INFORMATION PROCESSING DEVICE, CONTROL METHOD, AND RECORDING MEDIUM WITH RESTRICTION FUNCTION

(71) Applicant: SHARP KABUSHIKI KAISHA, Sakai (JP)

(72) Inventor: Satoshi Awata, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/882,653

(22) Filed: May 25, 2020

(65) Prior Publication Data

US 2020/0382665 A1 Dec. 3, 2020

(30) Foreign Application Priority Data

May 30, 2019 (JP) .............................. JP2019-101551

(51) Int. Cl.
*H04N 1/00* (2006.01)
*H04N 1/44* (2006.01)

(52) U.S. Cl.
CPC ....... *H04N 1/00514* (2013.01); *H04N 1/4433* (2013.01)

(58) Field of Classification Search
CPC .................... H04N 1/00514; H04N 1/4433
See application file for complete search history.

(56) References Cited

U.S. PATENT DOCUMENTS

| | | | |
|---|---|---|---|
| 2004/0184658 A1* | 9/2004 | Inoue | H04N 1/603 382/162 |
| 2011/0205594 A1* | 8/2011 | Chida | G06F 3/1256 358/1.18 |
| 2013/0215446 A1* | 8/2013 | Imai | H04N 1/4433 358/1.13 |
| 2013/0247177 A1* | 9/2013 | Park | G06F 21/44 726/21 |
| 2014/0005022 A1* | 1/2014 | Iida | B65H 37/04 493/405 |
| 2019/0191038 A1* | 6/2019 | Naito | H04N 1/4406 |
| 2019/0289146 A1* | 9/2019 | Kobayashi | H04N 1/00411 |
| 2020/0364005 A1* | 11/2020 | Takenaka | G06F 3/1255 |

FOREIGN PATENT DOCUMENTS

| | | |
|---|---|---|
| JP | 2010-039926 A | 2/2010 |
| JP | 5025684 B2 | 9/2012 |
| JP | 5106660 B2 | 12/2012 |

\* cited by examiner

*Primary Examiner* — Juan M Guillermety
(74) *Attorney, Agent, or Firm* — ScienBiziP, P.C.

(57) ABSTRACT

Provided is an information processing device connected to a device that executes a process in accordance with a function selected by a user among a plurality of functions, the information processing device includes a setter that sets a first function and a second function from the plurality of functions and a restrictor that restricts the first function, and the restrictor releases the restriction on the first function if the user selects the second function.

9 Claims, 23 Drawing Sheets

FIG. 3A

| | NAME | TYPE | DATA |
|---|---|---|---|
| | (DEFAULT) | REG_SZ | (VALUE NOT SET) |
| | AutoJobControl.. | REG_DWORD | 0x00000000 (0) |
| | ColorMode | REG_DWORD | 0x00000000 (0) |
| | DocumentFiling | REG_DWORD | 0x00000002 (2) |
| | Duplex | REG_DWORD | 0x00000002 (2) |
| | ForcedBW | REG_DWORD | 0x00000000 (0) |
| | ForcedDuplex | REG_DWORD | 0x00000001 (1) — D100 |
| | PermissionBooklet | REG_DWORD | 0x00000001 (1) — D102 |

Tree (left pane):
- EUDC
- Keyboard Layout
- Network
- Printers
- Software
  - AppDataLow
  - Classes
  - ODBC
  - Policies
    - AAA
    - BBB
    - MFC
      - PrintSettings
- System
  - CurrentControlSet
    - Control
    - DeviceContain

FIG. 3B

| NAME | DATA | CONTENTS |
|---|---|---|
| ForcedDuplex | 0x00000000(0) | TURN OFF FORCED DUPLEX PRINTING |
| | 0x00000001(1) | TURN ON FORCED DUPLEX PRINTING |

FIG. 3C

| NAME | DATA | CONTENTS |
|---|---|---|
| PermissionBooklet | 0x00000000(0) | NOT PERMIT SETTING OF BOOKLET FUNCTION DURING FORCED DUPLEX PRINTING |
| | 0x00000001(1) | PERMIT SETTING OF BOOKLET FUNCTION DURING FORCED DUPLEX PRINTING |

FIG. 5

| SETTING ITEM NAME | CHOICES | SETTING AVAILABILITY INFORMATION | | | |
| --- | --- | --- | --- | --- | --- |
| | | DUPLEX PRINTING | BOOKLET | POSTER | ... |
| DUPLEX PRINTING | NO<br>LONG-EDGE BINDING<br>SHORT-EDGE BINDING | - | UNSETTABLE | UNSETTABLE | ... |
| BOOKLET | NO<br>YES | UNSETTABLE | - | UNSETTABLE | ... |
| POSTER | NO<br>YES | UNSETTABLE | UNSETTABLE | - | ... |
| ⋮ | ⋮ | ⋮ | | | |

| FUNCTION NAME | SETTING CONTENTS | |
|---|---|---|
| \<DURING FORCED "DUPLEX PRINTING"\> | | |
| DOCUMENT SIZE | SHEET SIZE UNSUITABLE FOR DUPLEX PRINTING IS UNSETTABLE(EXCEPT WHEN OUTPUT SHEET SIZE IS NOT SET TO "SAME AS DOCUMENT SIZE") | |
| OUTPUT SHEET SIZE | SHEET SIZE UNSUITABLE FOR DUPLEX PRINTING IS UNSETTABLE | |
| SHEET TYPE | SHEET TYPE UNSUITABLE FOR DUPLEX PRINTING IS UNSETTABLE | D108 |
| BOOKLET | UNSETTABLE | |
| POSTER | UNSETTABLE | D110 |
| INSERT FUNCTION OHP FILM SYNTHESIS | UNSETTABLE | |
| INSERT FUNCTION CARBON COPY | UNSETTABLE | |
| CUSTOM IMAGE REGISTRATION | UNSETTABLE | |
| ⋮ | ⋮ | |

FIG. 16

| FUNCTION NAME | PARAMETER | SETTING AVAILABILITY INFORMATION ||||  |
|---|---|---|---|---|---|---|
| | | PAGE AGGREGATION | POSTER | ZOOM | CHAPTER DIVISION | ... |
| PAGE AGGREGATION | NO<br>2 in 1<br>4 in 1 | - | UNSETTABLE | UNSETTABLE | UNSETTABLE | ... |
| POSTER | NO<br>2x2<br>3x3<br>4x4 | UNSETTABLE | - | UNSETTABLE | UNSETTABLE | ... |
| ZOOM | NO<br>50%~400% | UNSETTABLE | UNSETTABLE | - | UNSETTABLE | ... |
| CHAPTER DIVISION | NO<br>YES | UNSETTABLE | UNSETTABLE | UNSETTABLE | - | ... |
| ⋮ | ⋮ | ⋮ |||| |

FIG. 17

| DURING FORCED "PAGE AGGREGATION" | |
|---|---|
| FUNCTION NAME | SETTING CONTENTS |
| ZOOM | UNSETTABLE |
| POSTER | UNSETTABLE |
| CHAPTER DIVISION | UNSETTABLE |
| OVERLAY PRINTING METHOD | INSERT PAGE IS UNSETTABLE |
| DOCUMENT SIZE | LONG IS UNSETTABLE |
| ⋮ | ⋮ |
| ⋮ | |

FIG. 19
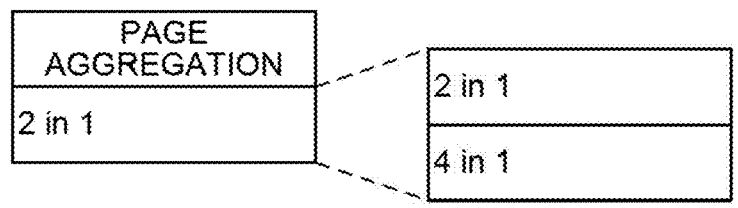

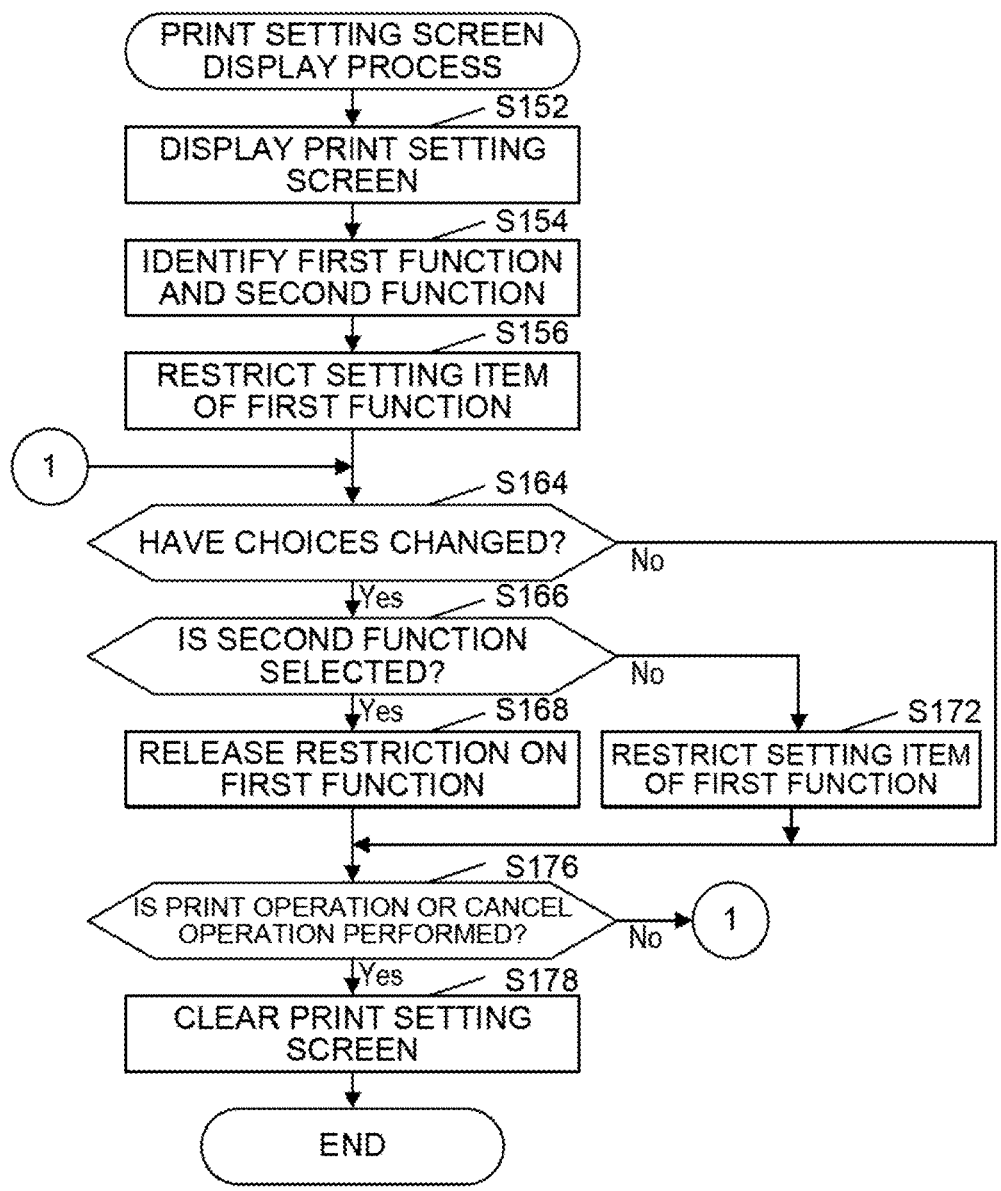

FIG. 23A
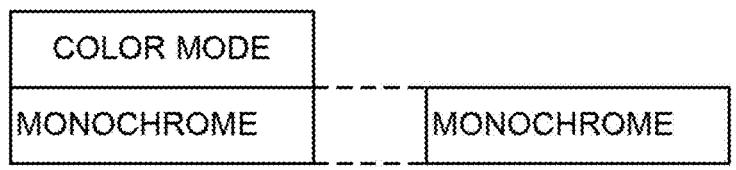
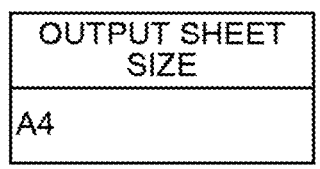
FIG. 23B
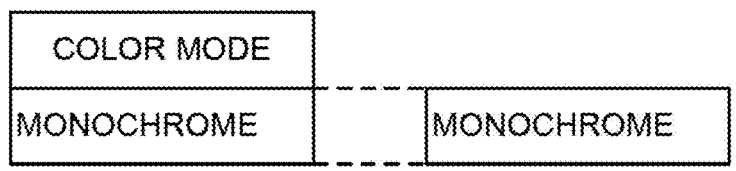
FIG. 23C
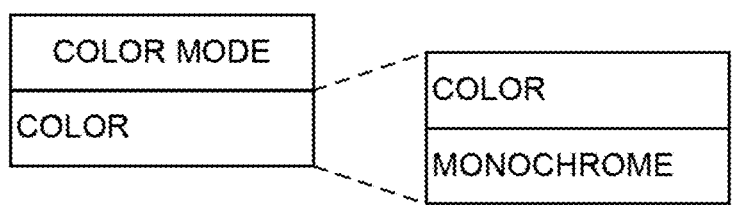
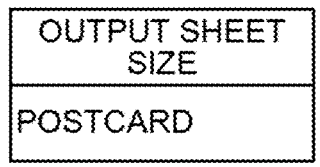

1

INFORMATION PROCESSING DEVICE, CONTROL METHOD, AND RECORDING MEDIUM WITH RESTRICTION FUNCTION

This Nonprovisional application claims priority under 35 U.S.C. § 119(a) on Patent Application No. 2019-101551 filed in Japan on 30 May 2019, the entire contents of which are hereby incorporated by reference.

BACKGROUND OF THE INVENTION

Field of the Invention

The present invention relates to an information processing device and the like.

Description of the Background Art

Recent image forming apparatuses are equipped with various functions, and a technique for appropriately setting a function used for image formation has also been proposed.

For example, in a network in which a server device, a terminal device, and an image forming apparatus are connected, a technique has been proposed in which the server device restricts (determines) a setting item for which a change of a setting value by a printer driver installed in the terminal device is permitted (see, for example, Japanese Unexamined Patent Application Publication No. 2010-039926, hereinafter referred to as "Patent Document 1").

Further, a technique has been proposed in which, if an inconsistency (conflict) between setting values set for a plurality of setting items occurs, a setting value set later is used to change a setting value of another setting item to a setting value that does not cause a conflict, and to make a change of the setting value impossible (see, for example, Japanese Patent No. 5106660 and Japanese Patent No. 5025684, hereinafter referred to as Patent Document 2 and Patent Document 3, respectively).

According to Patent Document 1, Patent Document 2, and Patent Document 3, after restricting the setting items for which a change of the setting value is permitted, it is possible to change the setting value to a setting value that does not cause a conflict. However, the restriction on the setting item for which a change of the setting value is permitted cannot be released, and thus, it may not be possible to change the setting value that was changed so that no conflict occurs, into another setting value. As a result, there is a problem in that a user cannot appropriately select a function that the user desires to use.

In view of the problem described above, an object of the present application is to provide an information processing device and the like capable of appropriately releasing a restriction imposed on a predetermined function.

SUMMARY OF THE INVENTION

To solve the problem described above, an information processing device according to the present invention is an information processing device connected to a device that executes a process in accordance with a function selected by a user among a plurality of functions, the information processing device includes a setter that sets a first function and a second function from the plurality of functions, and a restrictor that restricts the first function, and the restrictor releases the restriction on the first function if the user selects the second function.

A control method according to the present invention is a control method of an information processing device connected to a device that executes a process in accordance with a function selected by a user among a plurality of functions, in which the control method includes setting a first function and a second function from the plurality of functions, and restricting the first function, in which in the restricting, the restriction on the first function is released if the user selects the second function.

A computer-readable storage medium according to the present invention is a computer-readable storage medium that stores a program of an information processing device connected to a device that executes a process in accordance with a function selected by a user among a plurality of functions, the program having a setting function of setting a first function and a second function from the plurality of functions, and a restricting function of restricting the first function, in which the restricting function releases the restriction on the first function if the user selects the second function.

According to the present invention, it is possible to appropriately release a restriction imposed on a predetermined function.

BRIEF DESCRIPTION OF THE DRAWINGS

FIG. 3A to FIG. 3C are diagrams for describing registry data according to the first embodiment;

FIG. 5 is a diagram for describing option definition data according to the first embodiment;

FIG. 6 is a diagram for describing restriction definition data according to the first embodiment;

FIG. 16 is a diagram for describing option definition data according to a second embodiment;

FIG. 17 is a diagram for describing restriction definition data according to the second embodiment;

FIG. 19 is a diagram illustrating an example of an operation according to the second embodiment;

FIG. 21 is a flowchart for describing a print setting screen display process according to a third embodiment;

FIG. 23A to FIG. 23C are diagrams each illustrating an example of an operation according to the third embodiment.

DESCRIPTION OF THE PREFERRED EMBODIMENTS

Below, an embodiment of the present invention will be described with reference to the drawings. It is noted that, in the present embodiment, as an example, a printing system including a terminal device to which an information processing device according to the present invention is applied will be described. The embodiment described below is one example for realizing the present invention, and the contents of the present invention are not limited to the contents described in the embodiment.

1. First Embodiment

1.1 Overall Configuration

Figure 1:
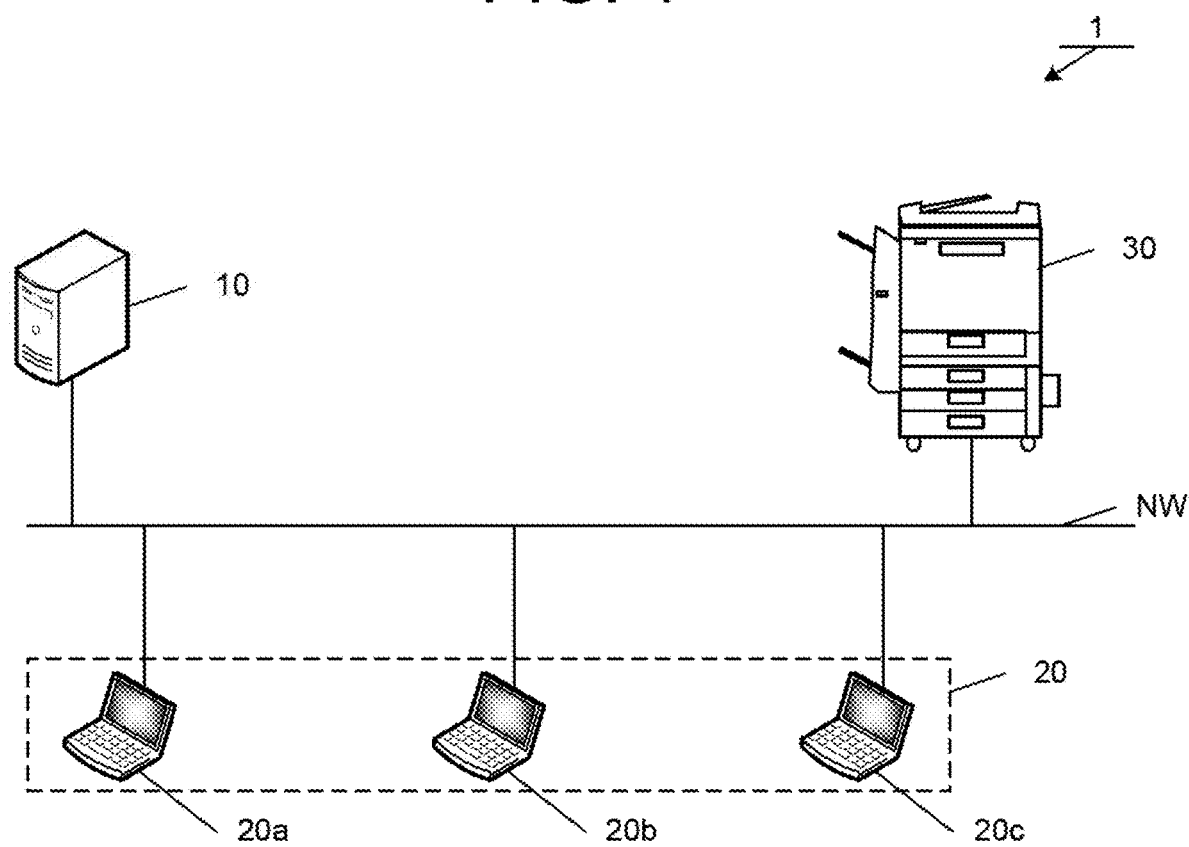
FIG. 1 is a diagram for describing an overall configuration of a printing system according to a first embodiment.

First, an overall configuration of a printing system 1 according to the present embodiment will be described with reference to FIG. 1. As illustrated in FIG. 1, a server device 10, a terminal device 20, and an image forming apparatus 30 are configured to be connected via a network NW. The network NW is, for example, a local area network (LAN).

The server device 10 is an information processing device that manages the terminal device 20. The server device 10 is configured by a personal computer (PC), for example. The server device 10 and the terminal device 20 are managed by an active directory, for example.

The terminal device 20 is an information processing device that transmits, to the image forming apparatus 30, image data to be output by the image forming apparatus 30. The terminal device 20 is configured by, for example, a PC, but may be configured by a device such as a tablet or a smartphone. Further, like terminal devices 20a, 20b, and 20c illustrated in FIG. 1, a plurality of terminal devices 20 may be connected to the network NW.

The image forming apparatus 30 is a device that executes printing by forming, on a recording sheet or the like, an image based on image data input from the outside, and is a so-called multifunctional apparatus.

The image forming apparatus 30 includes a plurality of functions such as a duplex printing function, a booklet making function, and a poster function. The image forming apparatus 30 executes a process based on a function selected by the user and a set parameter to form an image.

1.2 Functional Configuration
1.2.1 Server Device

Figure 2:
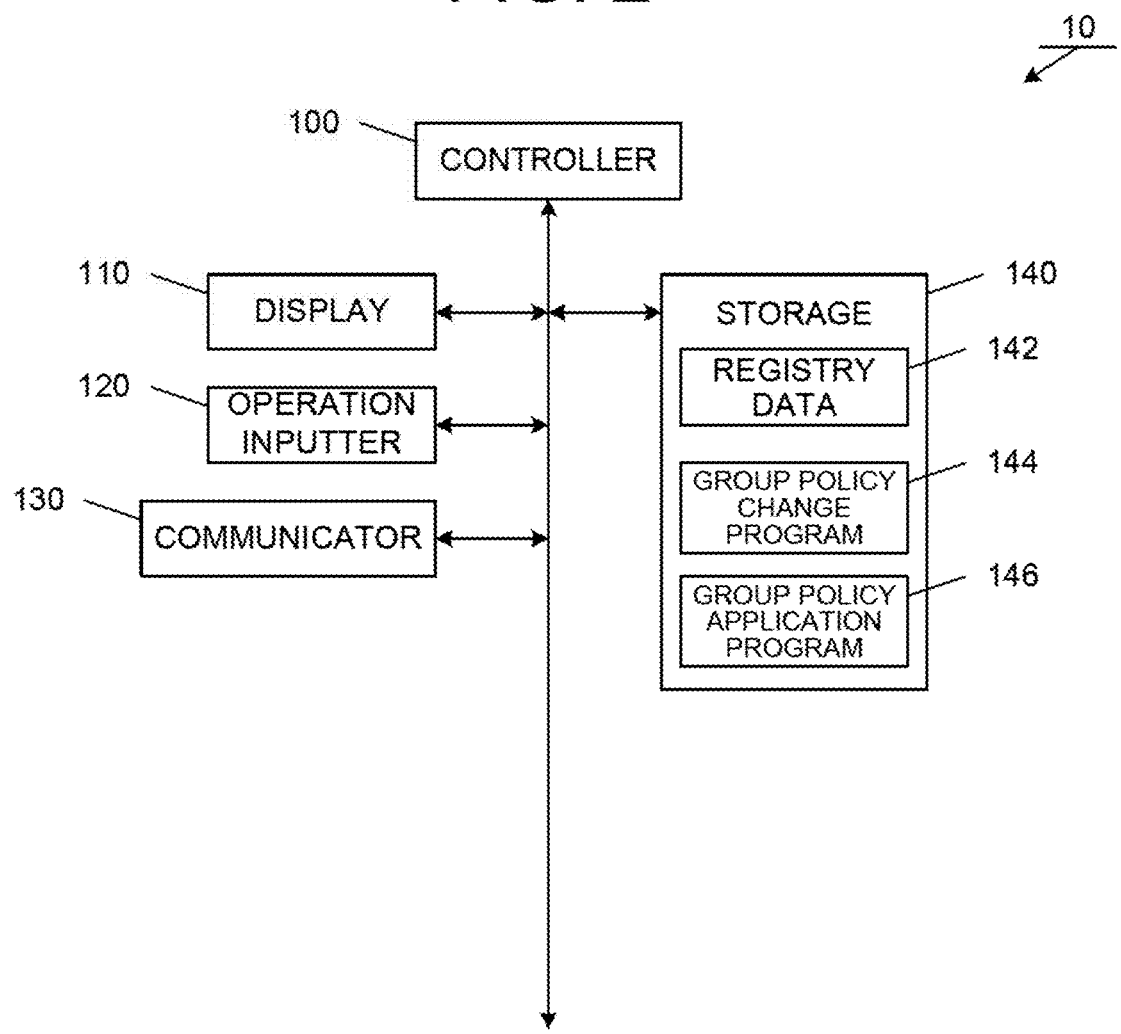
FIG. 2 is a functional block diagram for describing a functional configuration of a server device according to the first embodiment.

A functional configuration of the server device 10 will be described with reference to FIG. 2. As illustrated in FIG. 2, the server device 10 includes a controller 100, a display 110, an operation inputter 120, a communicator 130, and a storage 140.

The controller 100 is a functional element that controls the entire server device 10. The controller 100 realizes various types of functions by reading and executing various types of programs, and includes one or a plurality of arithmetic devices (for example, a Central Processing Unit (CPU)).

The display 110 is a functional element that displays various types of information to the user, and is configured by, for example, a liquid crystal display (LCD), an organic electro-luminescence (EL) display, or the like.

The operation inputter 120 is a functional element on which the user performs various types of operations. The operation inputter 120 includes various operation devices such as a mouse and a keyboard.

The communicator 130 is a functional element used by the server device 10 to communicate with an outside device. For example, the communicator 130 is configured by a communication module such as a network interface card (NIC) utilized in a wired/wireless LAN.

The storage 140 stores registry data 142 that is data indicating a setting of the server device 10, a group policy change program 144, and a group policy application program 146.

The registry data 142 is setting data indicating an overall setting relating to the server device 10. In the present embodiment, data (registry data) stored in a registry managed by Windows (registered trademark) is used as the setting data.

In the present embodiment, the registry data 142 stores information of a restricting function and a function of permitting a setting, among functions executable by the image forming apparatus 30. The restricting function refers to a function of forcing selection or non-selection, or of making only a predetermined parameter selectable. Further, the function of permitting setting refers to a function permitting a setting of selection or non-selection.

FIG. 3A is a diagram illustrating an example of the registry data 142. The registry is a database having a hierarchical structure, and each level of the hierarchical structure is identified by a registry key. FIG. 3A illustrates a state in which, among the registry data 142, the value of a registry key "PrintSettings" that defines a function relating to printing by the image forming apparatus 30 is displayed.

As illustrated in FIG. 3A, one or a plurality of values are stored for one registry key. For example, as a value of the registry key "PrintSettings", for example, a value (flag) such as "ForcedDuplex=0x00000001 (1)" as indicated by D100 or a value such as "PermissionBooklet=0x00000001 (1)" as indicated by D102 is stored.

A content indicated by the value of the registry key is interpreted by a program that reads the value of the registry key. FIGS. 3B and 3C are tables illustrating examples of possible values and contents of the registry key. As illustrated in FIG. 3B, the value of "ForcedDuplex=0x00000000 (0)" indicates that a restriction forcing selection of the duplex printing function provided in the image forming apparatus 30 is turned off. On the other hand, the value of "ForcedDuplex=0x00000001 (1)" indicates that the restriction forcing selection of the duplex printing function provided in the image forming apparatus 30 is turned on.

Further, as illustrated in FIG. 3C, the value of "PermissionBooklet=0x00000000 (0)" indicates that setting for the booklet making function provided in the image forming apparatus 30 is not permitted if the selection of the duplex printing function is forced. On the other hand, the value of "PermissionBooklet=0x00000001 (1)" indicates that the setting for the booklet making function provided in the image forming apparatus 30 is permitted if the selection of the duplex printing function is forced.

In the present embodiment, among the functions executable by the image forming apparatus 30, the restricting function is referred to as a first function. Further, the function of permitting setting is referred to as a second function. In the example of FIG. 3A, the first function is a duplex printing function, and the second function is a booklet making function.

The group policy change program 144 is a program that displays a group policy change screen for restricting a function executed by the image forming apparatus 30 and performing setting or a change of permission of a setting relating to a function executed by the image forming apparatus 30. For example, the group policy change program 144 is realized by an edit function of a group policy that is a function of the Active Directory.

The group policy application program 146 applies a group policy changed by the group policy change program 144 to the terminal device 20. For example, the group policy application program 146 is realized by a function that applies a group policy that is a function of the Active Directory.

1.2.2 Terminal Device

Figure 4:
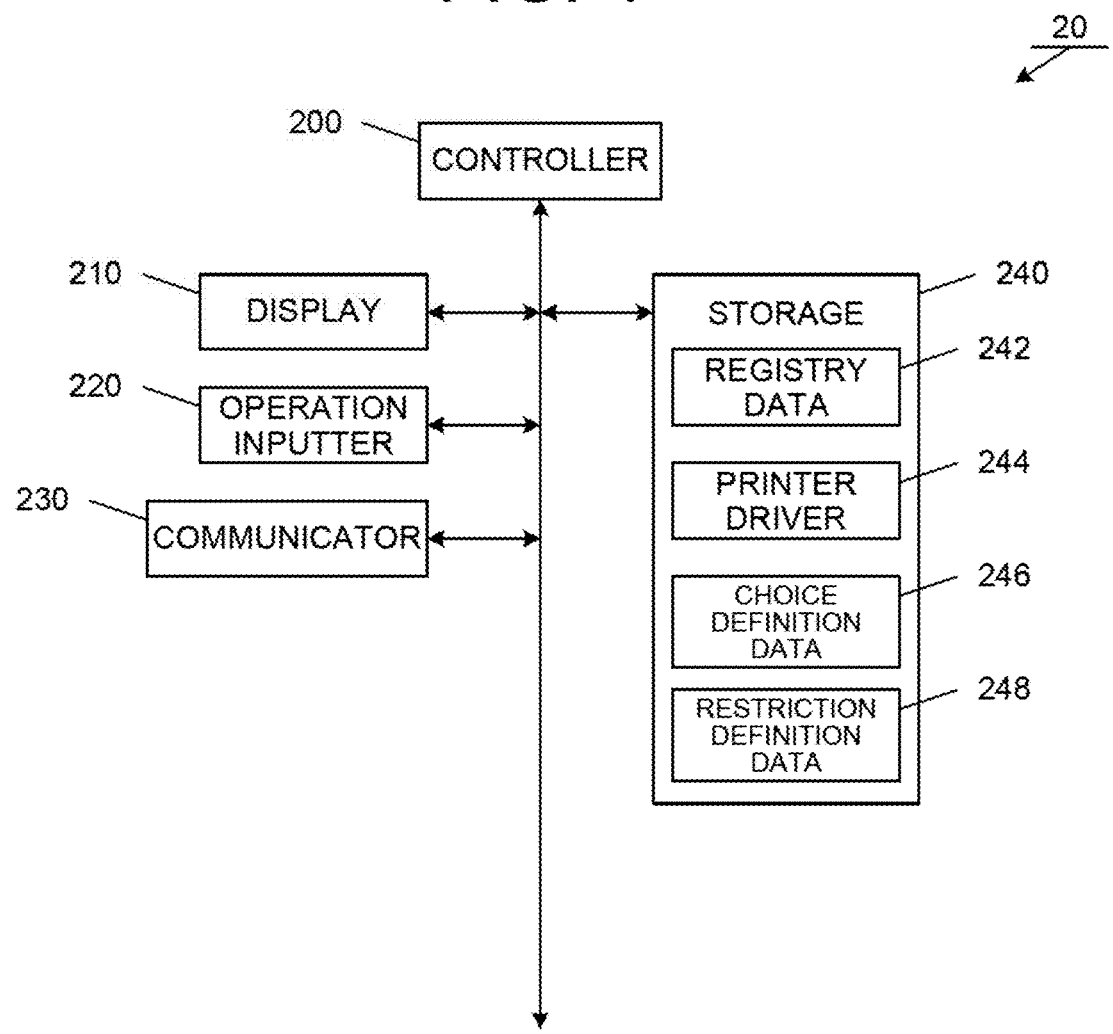
FIG. 4 is a functional block diagram for describing a functional configuration of an information processing device according to the first embodiment.

A functional configuration of the terminal device 20 will be described with reference to FIG. 4. As illustrated in FIG. 4, the terminal device 20 includes a controller 200, a display 210, an operation inputter 220, a communicator 230, and a storage 240.

The controller 200 is a functional element that controls the entire terminal device 20. The controller 200 realizes various types of functions by reading and executing various types of programs, and is configured by one or a plurality of arithmetic devices (for example, a CPU).

The display 210 is a functional element that displays various types of information to the user, and is configured by, for example, an LCD, an organic EL display, or the like.

The operation inputter 220 is a functional element on which the user performs various types of operations. The operation inputter 220 includes various operation devices such as a mouse and a keyboard.

The communicator 230 is a functional element used by the terminal device 20 to communicate with an outside device. For example, the communicator 230 is configured by a communication module such as an NIC utilized in a wireless LAN.

The storage 240 is a functional element that stores various types of programs and various types of data necessary for an operation of the terminal device 20. For example, the storage 240 is configured by a solid-state drive (SSD) that is a semiconductor memory, a hard disk drive (HDD), or the like.

The storage 240 stores registry data 242 that is data indicating a setting of the terminal device 20, a printer driver 244, option definition data 246, and restriction definition data 248.

The registry data 242 is setting data indicating an overall setting relating to the terminal device 20. In the present embodiment, data (registry data) stored in a registry managed by Windows is used as the setting data. The registry data 242 is a database having a hierarchical structure similar to the registry data 142.

The printer driver 244 is a program having a function of converting text data, presentation data, and the like created/edited by the user into image data that can be formed into an image by the image forming apparatus 30. Further, the printer driver 244 has a function of displaying, on the display 210, a print setting screen for selecting a function to be executed when the image forming apparatus 30 outputs the image data and performing setting of a parameter. Further, the printer driver 244 has a function of converting a content of the setting performed on the print setting screen into print setting information, and transmitting the print setting information and the image data to the image forming apparatus 30.

The option definition data 246 is data in which a setting item displayed on the print setting screen and an option selectable by the user are defined. As illustrated in FIG. 5, the option definition data 246 includes, for example, a setting item name (for example, "Duplex printing") and an option (for example, "No, Long-edge binding, Short-edge binding").

In the present embodiment, description will be given assuming that the setting item is displayed in units of functions provided in the image forming apparatus 30. For example, a setting item having a setting item name "Duplex printing" is a setting item for performing a setting relating to the duplex printing function, and a setting item having a setting item name "Booklet making" is a setting item for performing a setting relating to the booklet making function. Further, in the present embodiment, "No" in the options indicates that the function is not selected, and "Yes" indicates that the function is selected. An option other than "No" and "Yes" indicates that the function is selected and further, a value of the selected option is used as a parameter of the function.

Further, the option definition data 246 stores setting availability information that defines whether another setting item is settable if a function is selected.

Specifically, D106 in FIG. 5 indicates that for a setting item having a setting item name "Duplex printing", the user can select any option among "No", "Long-edge binding", and "Short-edge binding". If "Long-edge binding" is selected from among the options, this indicates that the duplex printing function is selected and the parameter is set to "Long-edge binding". Further, if "Long-edge binding" or "Short-edge binding" is selected, this indicates that a setting relating to the booklet making function and the poster function cannot be performed. Specifically, if "Long-edge binding" or "Short-edge binding" is selected for a setting item having the setting item name "Duplex printing", a change of the setting is not possible for a setting item having the setting item name "Booklet making" and a setting item having the setting item name "poster". If a certain function is selected, a function that cannot be set includes, for example, a function that cannot be selected simultaneously (a function that cannot be selected in conjunction with a selection of the certain function) and a function that causes inconvenience for the user if being selected simultaneously to the certain function.

The restriction definition data 248 is data in which a restriction on another function in conjunction with the restriction is defined if selection of a predetermined function is forced. For example, D108 of FIG. 6 indicates that if the selection of the duplex printing function is forced, a sheet size unsuitably for duplex printing cannot be set as a parameter for a document size function for selecting a size of the recording sheet on which the image forming apparatus 30 forms the image. Further, D110 in FIG. 6 indicates that the setting for the booklet making function cannot be performed if the selection of the duplex printing function is forced.

1.2.3 Image Forming Apparatus

Figure 7:
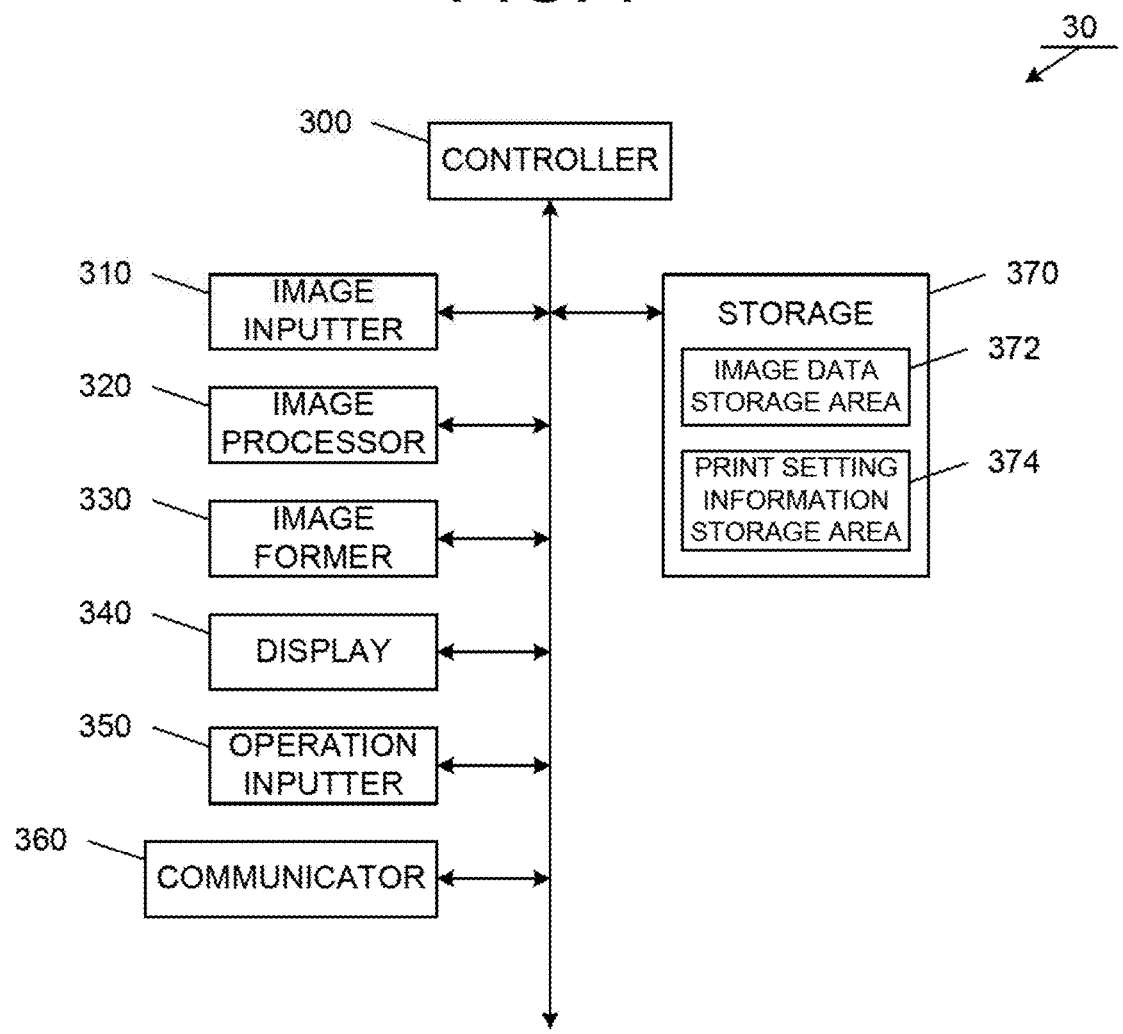
FIG. 7 is a functional block diagram for describing a functional configuration of an image forming apparatus according to the first embodiment.

A functional configuration of the image forming apparatus 30 will be described with reference to FIG. 7. As illustrated in FIG. 7, the image forming apparatus 30 includes a controller 300, an image inputter 310, an image processor 320, an image former 330, a display 340, an operation inputter 350, a communicator 360, and a storage 370.

The controller 300 is a functional element that controls the entire image forming apparatus 30. The controller 300 realizes various types of functions by reading and executing various types of programs, and includes one or a plurality of arithmetic devices (for example, a CPU).

The image inputter 310 is a functional element that reads image data input into the image forming apparatus 30. For example, a document reading device such as a scanner is connected to the image inputter 310 to input the image data output from the document reading device. Further, the image inputter 310 may receive the image data from a storage medium such as a universal serial bus (USB) memory or an SD card.

The image processor 320 is a functional element that performs various types of image processes on image data. For example, the image processor 320 performs a sharpening process on image data or performs a color conversion process thereon.

The image former 330 is a functional element that forms the image data stored in an image data storage area 372 on a recording medium (for example, the recording sheet), based on the print setting information stored in a print setting information storage area 374. The image former 330 is configured by a laser printer or the like utilizing an electrophotographic method, for example.

The display 340 is a functional element that displays various types of information to the user. For example, the display 340 is configured by an LCD or the like. Further, the operation inputter 350 is a functional element on which the user performs various types of operations. For example, the operation inputter 350 is configured by a touch panel overlaid and provided on the display 340. Touch detection through the touch panel is realized by an electrostatic induction method, a pressure-sensitive method, or a well-known technique. It is noted that the operation inputter 350 may be realized by a hard key, or may be a combination of the touch panel and the hard key.

The communicator 360 is a functional element used by the image forming apparatus 30 to communicate with an outside device. For example, the communicator 360 is configured by a communication module such as an NIC utilized in a wireless LAN.

The storage 370 is a functional element that stores various types of programs and various types of data necessary for an operation of the image forming apparatus 30. For example, the storage 370 is configured by an SSD that is a semiconductor memory, an HDD, or the like.

The image data storage area 372 that stores image data received from the terminal device 20 and the print setting information storage area 374 that stores print setting information received from the terminal device 20 are secured in the storage 370. The image data and the print setting information are stored in association with each other, and the image data is formed on a recording medium, based on the corresponding print setting information.

1. 3 Process Flow 1. 3. 1 Process Flow of Server Device

Figure 8:
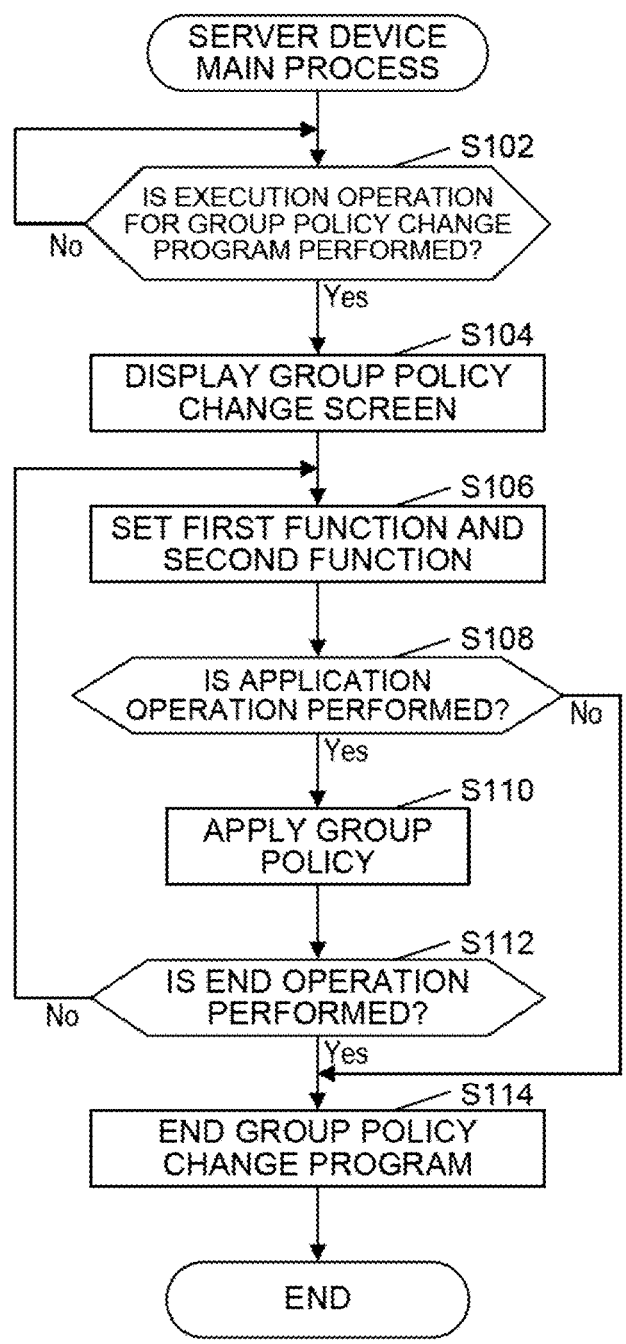
FIG. 8 is a flowchart for describing a main process of the server device according to the first embodiment.

A process flow according to the present embodiment will be described with reference to the drawings. First, a process flow of the server device 10 will be described with reference to FIG. 8.

The controller 100 determines whether the user has performed an operation to execute the group policy change program 144 (step S102). If the operation for executing the group policy change program 144 is performed by the user, the controller 100 displays the group policy change screen on the display 110 by executing the group policy change program 144 (step S102; Yes to step S104). Based on the user operation, the controller 100 sets the first function and the second function, among the functions of the image forming apparatus 30 (step S106).

If an application operation is performed by the user, the controller 100 applies the content set on the group policy change screen to the terminal device 20 (step S108; Yes to step S110). The application operation is, for example, an operation in which an "apply" button displayed on the group policy change screen is selected by the user. Further, as a process for applying the group policy to the terminal device 20, the controller 100 stores, as a value of the registry key, the content set on the group policy change screen, in the registry data 142. The controller 100 executes the group policy application program 146, and transmits, to the terminal device 20, a value of the registry key defined for a function relating to printing stored in the registry data 142.

Next, if the user performs an end operation being an operation for ending the group policy change program 144, the controller 100 terminates the group policy change program 144 (step S112; Yes to Step S114). The end operation is, for example, an operation in which an "OK" button or a "Cancel" button displayed on the group policy change screen is selected by the user. It is noted that, if the "OK" button is selected, the controller 100 applies the group policy to the terminal device 20 and terminates the process, and if the "Cancel" button is selected, the controller 100 may terminate the process without applying the group policy to the terminal device 20. If the end operation is not performed, the process returns to step S106 (step S112; No to step S106).

1.3.2 Process Flow of Terminal Device

Figure 9:
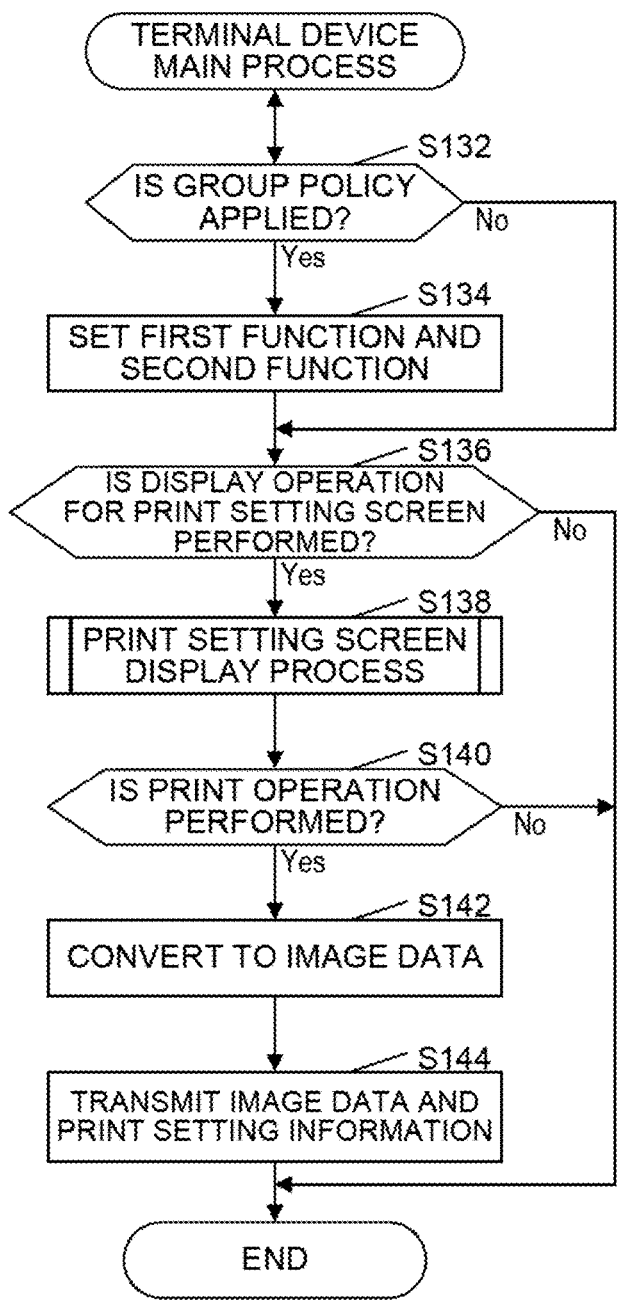
FIG. 9 is a flowchart for describing a main process of a terminal device according to the first embodiment.

Subsequently, a process flow of the terminal device 20 will be described with reference to FIG. 9. First, the controller 200 determines whether the group policy is applied from the server device 10 (step S132). For example, the controller 200 performs an inquiry to the server device 10 to determine whether the group policy is applied. It is noted that the controller 200 may determine that the group policy is applied if the value of the registry key that defines the function relating to printing is received from the server device 10.

If the group policy is applied, the controller 200 sets the first function and the second function (step S132; Yes to step S134). For example, the controller 200 stores the value of the registry key received from the server device 10 in the registry data 242. As a result, the server device 10 and the terminal device 20 share the value of the registry key that defines the function relating to printing, and the first function and the second function set in the server device 10 are also set in the terminal device 20.

Figure 10:
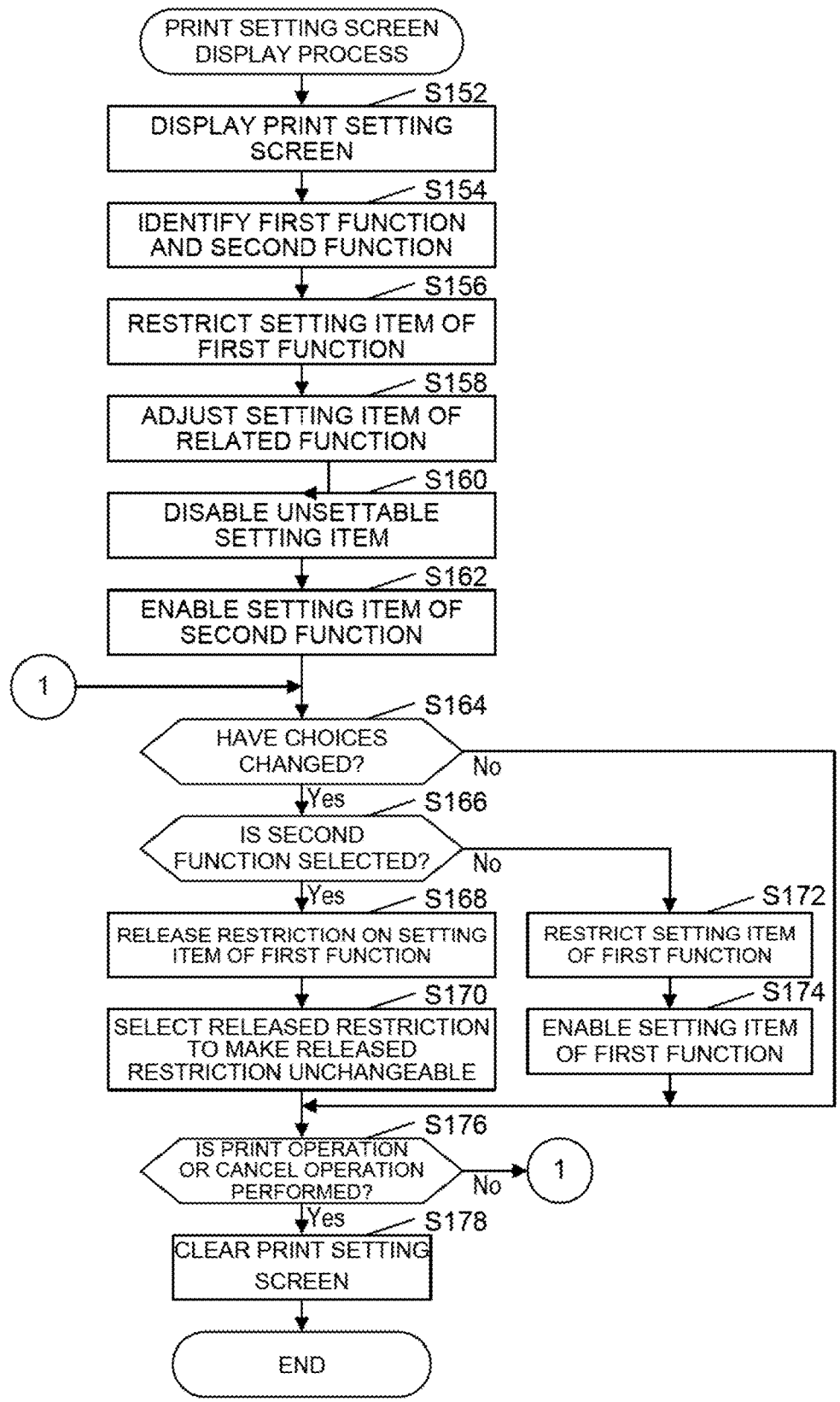
FIG. 10 is a flowchart for describing a print setting screen display process according to the first embodiment.

Subsequently, the controller 200 determines whether an operation of displaying the print setting screen is performed by the user (step S136). If the operation of displaying the print setting screen is performed, the controller 200 executes a process of displaying the print setting screen (print setting screen display processing) (step S136; Yes to step S138). The print setting screen display process will be described with reference to FIG. 10.

First, the controller 200 executes a function of displaying the print setting screen provided in the printer driver 244, and displays the print setting screen on the display 210 (step S152). Specifically, the controller 200 reads the option definition data 246, generates a list that displays an option for each setting item, and displays a print setting screen in which the generated list is arranged at a predetermined position on the print setting screen.

Subsequently, the controller 200 identifies the first function and the second function (step S154). For example, the controller 200 refers to the registry data 242 and if the registry data 242 stores a value indicating that the restriction for forcing selection of the duplex printing function is turned on, the controller 200 identifies the first function as the duplex printing function. Similarly, the controller 200 refers to the registry data 242 and if the registry data 242 stores a value indicating that setting for the booklet making function is permitted, the controller 200 identifies the second function as the booklet making function.

Subsequently, based on the content of the value stored in the registry data 242, the controller 200 restricts a setting item corresponding to the first function from the print setting screen (step S156). For example, if the first function is the duplex printing function and the content of the restriction is to force the selection of the duplex printing, the controller 200 deletes "No" from the options of the setting item of the duplex printing so that an option other than "No" (for example, "Long-edge binding") is always selected. As a result, the user cannot select a single-sided printing function, and is forced to select the duplex printing function. As described above, by deleting a predetermined option from the setting item corresponding to the first function, it is possible to force the selection of a function, to disable the selection of a function, or to make only a predetermined parameter selectable.

Subsequently, the controller 200 reads the restriction definition data 248, and adjusts a setting item corresponding to a function restricted in conjunction with the restriction of the first function (step S158). For example, in the example of FIG. 6, if a restriction is imposed to force the selection of the duplex printing function, a restriction is applied so that it is not possible to set a sheet size unsuitable for duplex printing as a parameter of an output sheet size type, or so that it is not possible to perform the setting of booklet making. Thus, the controller 200 deletes an option corresponding to a parameter of the sheet size unsuitable for duplex printing from the setting items corresponding to an output sheet size function, and disables (grays out) a setting item corresponding to the booklet making function.

Subsequently, the controller 200 reads the option definition data 246, and disables a setting item that cannot be set by the function selected as a result of the processing in steps S156 and S158 (step S160). For example, if the duplex printing function is selected by the process of step S156, the setting items for booklet making and poster are grayed out so that the setting relating to the booklet making function and the poster function cannot be performed.

Subsequently, the controller 200 enables a setting item corresponding to the second function (step S162). For example, if the second function is the booklet making function, the controller 200 enables the setting item for booklet making even if the setting item for booklet making is disabled in step S160.

Subsequently, the controller 200 determines whether the option has been changed by the user (step S164). If the option has been changed, the controller 200 determines whether the second function has been selected (step S164; Yes to step S166).

If the second function is selected, the controller 200 releases the restriction on the setting item corresponding to the first function (step S166; Yes to step S168). For example, if an option is deleted from a selection item corresponding to the first function in step S156, the restriction is released by adding the option deleted in step S156 to the selection item corresponding to the first function. Further, the controller 200 selects the released restriction and makes the selection unchangeable (step S170). In this manner, the selection of the restriction released in step S168 can be maintained.

For example, if the first function is the duplex printing function and the content of the restriction is to force the selection of duplex printing, in step S168, the restriction of forced duplex printing is released, and the single-sided printing function becomes selectable. Next, in step S170, the single-sided printing function is selected (the duplex printing function is not selected), and this state is made unchangeable.

On the other hand, if the second function is not selected in step S166, the controller 200 restricts the setting item corresponding to the first function by a similar process as in step S156 (step S166; No to step S172). Further, the setting item corresponding to the first function is enabled, and the option becomes changeable (step S174). It is noted that, if the setting item corresponding to the first function has already been restricted at the time of step S166, the controller 200 may skip the processing of steps S172 and S174.

Subsequently, the controller 200 determines whether a print operation or a cancel operation is performed from the print setting screen. The print operation is, for example, an operation in which a "Print" button displayed on the print setting screen is selected by the user. Further, the cancel operation is, for example, an operation in which a "Cancel" button displayed on the print setting screen is selected by the user. If the print operation or the cancel operation is performed, the controller 200 clears the print setting screen (step S176; Yes to step S178). If the print operation or the cancel operation is not performed, the controller 200 returns to step S164 (step S176; No to step S164).

Returning to FIG. 9, the controller 200 determines whether the print operation is performed in step S176 (step S140). If the print operation is performed, the controller 200 converts, by a function of the printer driver 244, data (for example, text data) for which output is instructed by the user, into image data for which the image forming apparatus 30 can form an image (step S140; Yes to step S142). Further, the controller 200 transmits, by a function of the printer driver 244, a content set on the print setting screen as the print setting information, together with the image data converted in step S142, to the image forming apparatus 30 (step S144). In this way, information on a function selected on the print setting screen and a parameter corresponding to the selected option are transmitted to the image forming apparatus 30. It is noted that the image forming apparatus 30 stores the received image data in the image data storage area 372, and stores the print setting information in the print setting information storage area 374. Then, the image forming apparatus 30 executes a process of outputting the image data in accordance with the print setting information.

1.4 Operation Example 1.4.1 Operation Example of Group Policy Change Screen

Figure 11:
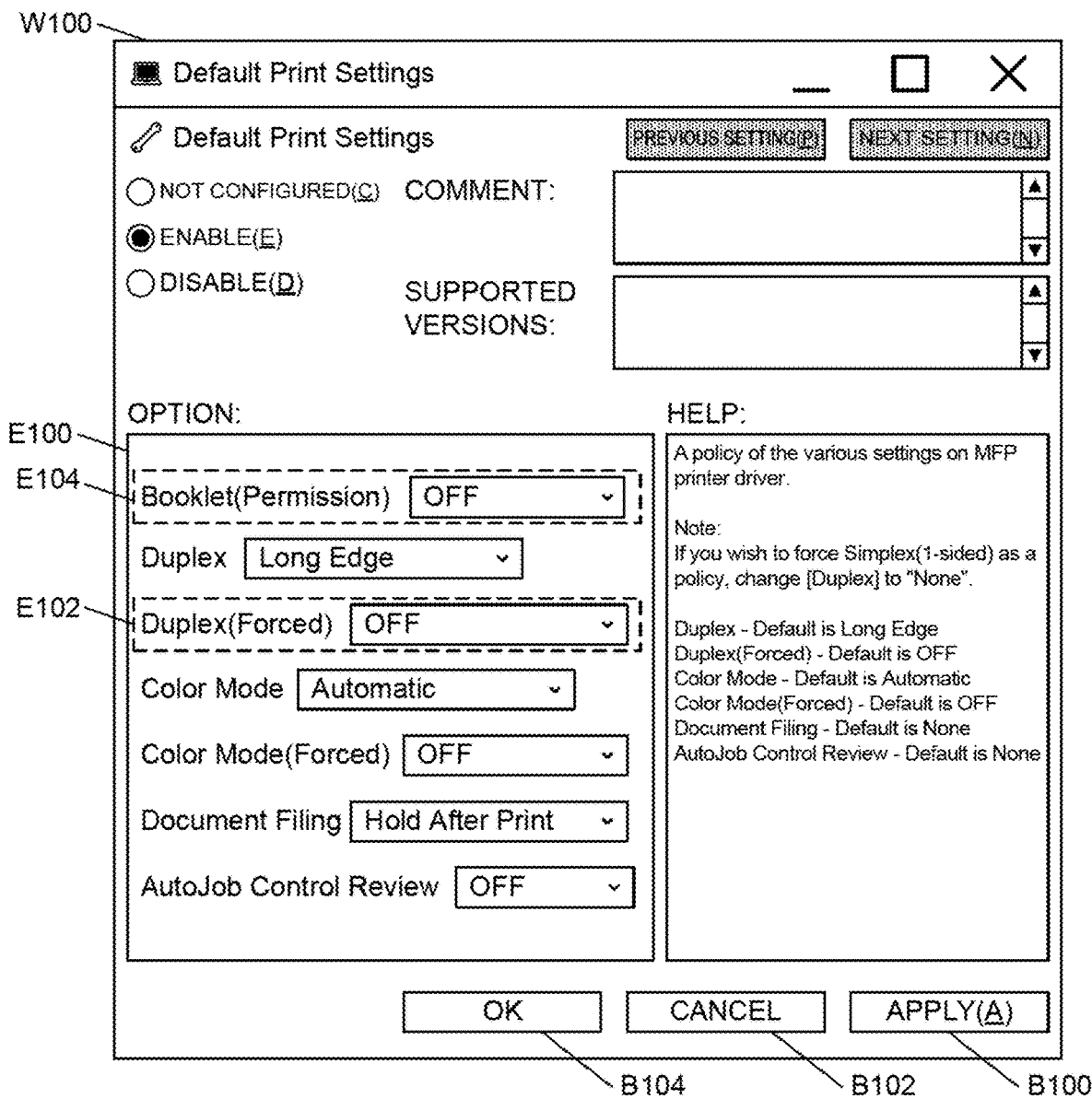
FIG. 11 is a diagram illustrating an example of an operation according to the first embodiment.

An operation example of the present embodiment will be described. FIG. 11 is an example of a group policy change screen W100. The group policy change screen W100 includes an area E100 in which a function relating to printing is settable.

The area E100 includes an area E102 in which a group policy "Duplex (Forced)" relating to a restriction for forcing the selection of the duplex printing function is settable, and an area E104 in which a group policy "Booklet (Permission)" that permits setting of the booklet making function is settable. The user can select any one of "ON" or "OFF" in the area E102. Further, the user can select any one of "ON" or "OFF" in the area E104.

Further, the group policy change screen W100 includes an apply button B100 for executing an application operation and a cancel button B102 for executing an end operation. It is noted that an OK button B104 for executing the application operation and terminating a registry data change program in the present state may be provided.

If the user selects the apply button B100 or the OK button B104, the group policy set on the group policy change screen W100 is stored in the registry data 142 of the server device 10.

In this operation example, the group policy "Duplex (Forced)" corresponds to "ForcedDuplex" of the registry data 142, and the group policy "Booklet (Permission)" corresponds to "PermissionBooklet" of the registry data 142. Therefore, if the group policy "Duplex (Forced)" is "ON", the value "ForcedDuplex=0x00000001 (1)" is stored in the registry key "PrintSettings" of the registry data 142. If the group policy "Duplex (Forced)" is "OFF", the value "ForcedDuplex=0x00000001 (0)" is stored in the registry key "PrintSettings" of the registry data 142. Similarly, if the group policy "Booklet (Permission)" is "ON", the value "PermissionBooklet=0x00000001 (1)" is stored in the registry key "PrintSettings" of the registry data 142. If the group policy "Booklet (Permission)" is "OFF", the value "PermissionBooklet=0x00000000 (0)" is stored in the registry key "PrintSettings" of the registry data 142.

1.4.2 Operation Example of Print Setting Screen

Figure 12:
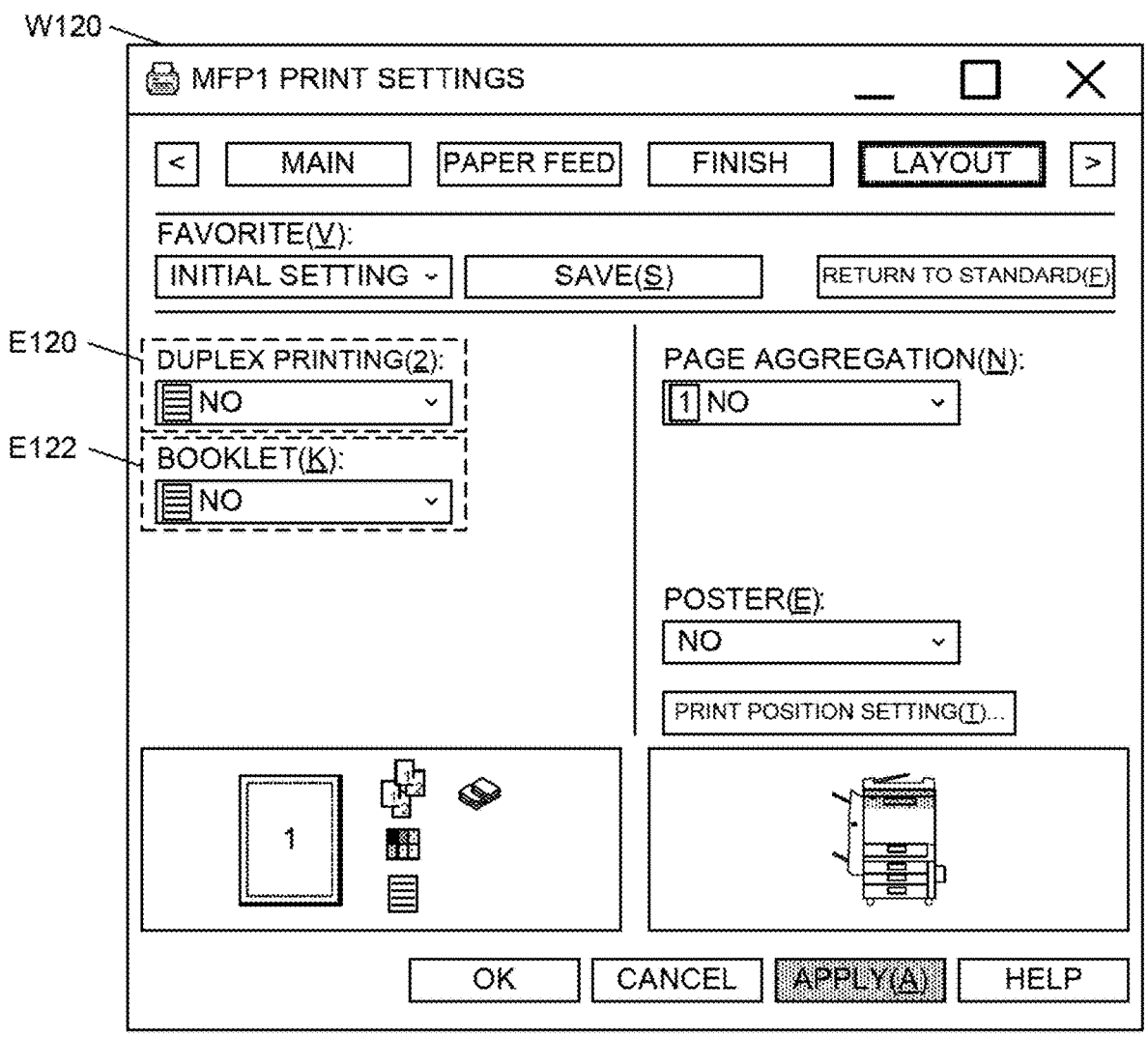
FIG. 12 is a diagram illustrating an example of an operation according to the first embodiment.

FIG. 12 is a screen example of a print setting screen W120. The print setting screen W120 includes a setting item E120 corresponding to the duplex printing function and a setting item E122 corresponding to the booklet making function. It is assumed that the duplex printing function and the booklet making function cannot be selected at the same time.

Figure 13A:
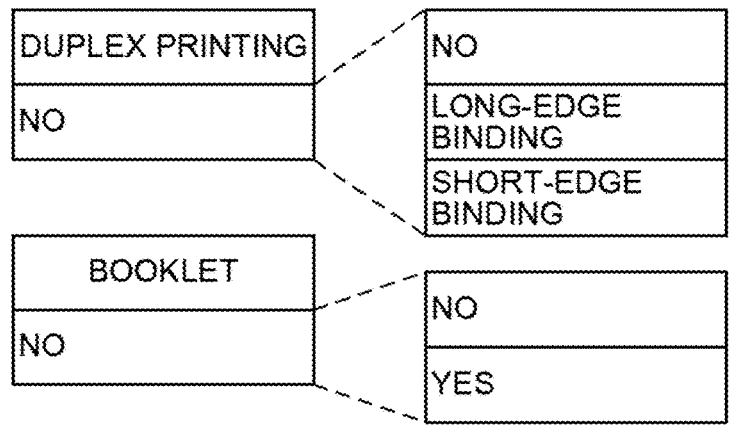
FIG. 13A to FIG. 13C are diagrams each illustrating an example of an operation according to the first embodiment.

A relationship between the setting item for duplex printing and the setting item for booklet making in a case where neither the first function nor the second function is set will be described with reference to FIGS. 13A to 13C. FIG. 13A is a diagram illustrating options of the setting item for duplex printing and options of the setting item for booklet making. If the print setting screen W120 is displayed, "No" is selected from the setting items of duplex printing and booklet making. Further, the user can select "No" or "Yes" from the setting items for booklet making on the print setting screen W120.

Figure 13B:
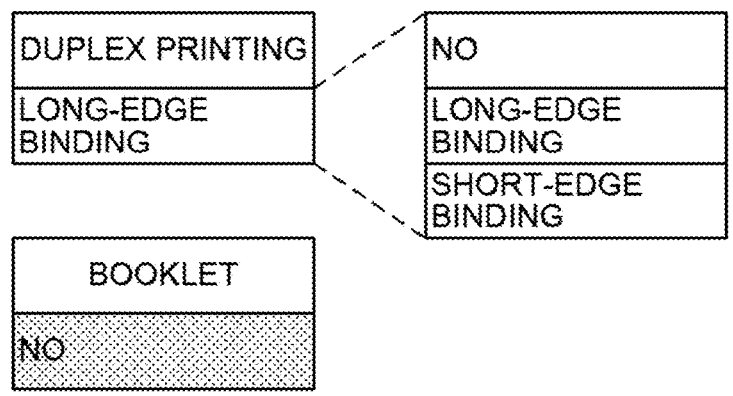
Figure 13C:
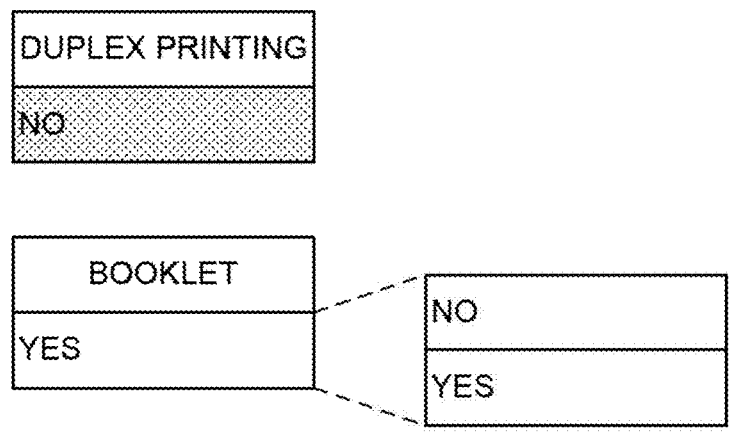

FIG. 13B is a diagram illustrating a state of the setting items for booklet making if "Long-edge binding" is selected from the setting items for duplex printing. Since the duplex printing function is selected, the setting item for booklet making is grayed out (disabled) in a state where "No" is selected, and "Yes" cannot be selected for the setting item for booklet making. Further, FIG. 13C is a diagram illustrating a state of the setting items for duplex printing if "Yes" is selected from the setting items for booklet making. In this case, the booklet making function is selected, and thus, the setting item for duplex printing is grayed out in a state where "No" is selected, and other options cannot be selected. As described above, the duplex printing function and the booklet making function cannot be selected at the same time, and thus, if one of the functions is selected, the other function cannot be selected.

Figure 14:
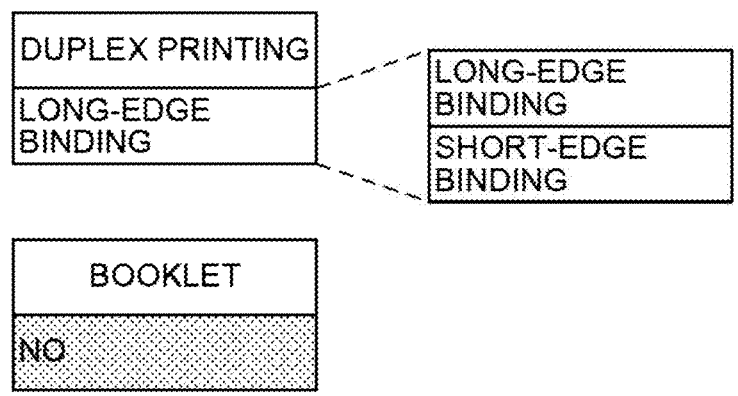
FIG. 14 is a diagram illustrating an example of an operation according to the first embodiment.

Next, FIG. 14 is a diagram illustrating the relationship between the setting items of duplex printing and booklet making in a case where the duplex printing function is set as the first function and the second function is not set. Since the selection of the duplex printing function is forced, "No" is deleted from the setting items of the duplex printing, and any one of "Long-edge binding" or "Short-edge binding" is selected. On the other hand, the setting item for booklet making is grayed out while "No" is selected, and "Yes" cannot be selected. As described above, the user cannot select the booklet making function in conjunction with the restriction that the selection of the duplex printing function is forced.

Figure 15A:
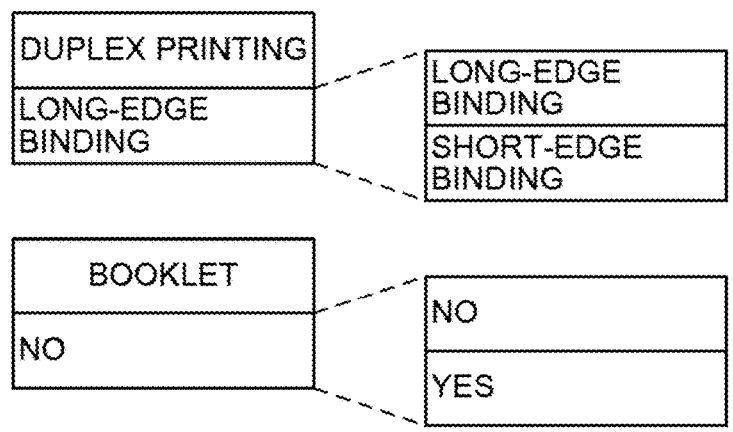
FIG. 15A to FIG. 15C are diagrams each illustrating an example of an operation according to the first embodiment.
Figure 15B:
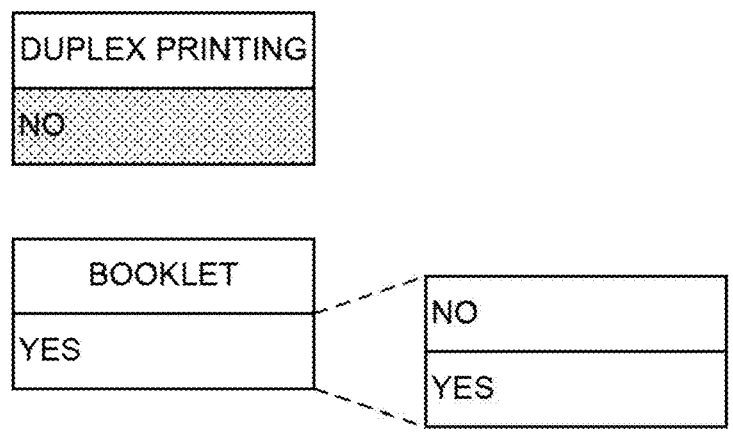
Figure 15C:
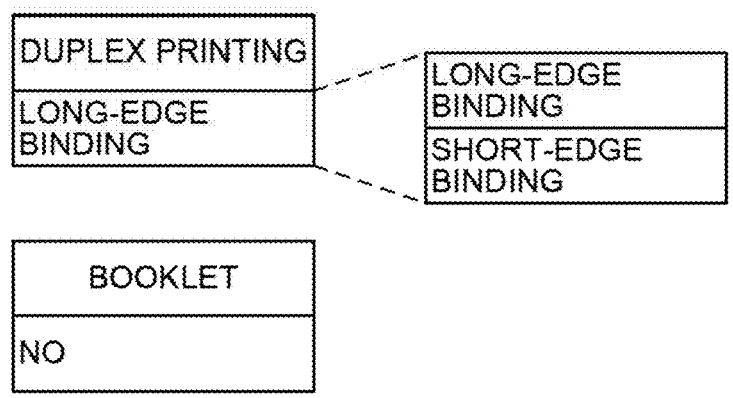

Next, FIG. 15A to FIG. 15C are diagrams illustrating the relationship between the setting items of duplex printing and booklet making in a case where the duplex printing function is set as the first function and the booklet making function is set as the second function. FIG. 15A is a diagram illustrating options of the setting item for duplex printing and options of the setting item for booklet making. Since the selection of the duplex printing function is forced, "No" is deleted from the setting items of duplex printing, and any one of "Long-edge binding" or "Short-edge binding" is selected. On the other hand, the setting of the booklet making function is permitted, and thus, the setting items for booklet making are enabled, and "No" or "Yes" can be selected.

FIG. 15B is a diagram illustrating the setting items for duplex printing in a case where "Yes" is selected from the setting items for booklet making. Originally, since the selection of the duplex printing function is forced, "No" cannot be selected from the setting items of duplex printing. However, if "Yes" is selected from the setting items for booklet making, the restriction on the duplex printing function is released, and "No" is selected from the setting items of duplex printing. Then, "No" is grayed out and cannot be changed. Therefore, if the booklet making function is selected, the duplex printing function is not selected (the single-sided printing function is selected).

FIG. 15C is a diagram illustrating a state of the setting item for duplex printing in a case where "No" is selected from the setting items for booklet making. In this case, "No" is deleted from the setting items for duplex printing, and any one of "Long-edge binding" or "Short-edge binding" is selected. In this way, if the booklet making function is not selected, selection of the duplex printing function is forced.

As described above, the state of the setting item for duplex printing is changed by switching between a state where the setting item for booklet making is "Yes" and a state where the setting item for booklet making is "No". Thus, the user can select the booklet making function that originally could not be selected if the selection of the duplex printing function is forced.

It is noted that, forcing of selection of the duplex printing function in the above description is the same as preventing the single-sided printing function from being selected. The interpretation of the content of the restriction on a specific function depends on the design of the image forming apparatus 30 and the printing system 1.

Further, in the above description, the first function is described as the duplex printing function, and the second function is described as the booklet making function. However, the second function may be a function different from the booklet making function. For example, as illustrated in the example of the restriction definition data 248 in FIG. 6, if the selection of the duplex printing function is forced, the selection of the poster function and the sheet size that can be selected as the output sheet are restricted. On the other hand, the poster function and a selection function of the output sheet size may be used as the second function.

For example, if the second function is the poster function, the controller 200 enables the setting items of the poster in step S162. Next, if the user selects the poster function (if "Yes" is selected from the options), the controller 200 only needs to select and gray out "No" from the setting items for duplex printing.

Further, if the second function is a selection function of the output sheet size, the controller 200 adds a sheet size unsuitable for duplex printing to the options of the setting item for the output sheet size in step S162. Next, if the user selects a sheet size unsuitable for duplex printing, the controller 200 only needs to select and gray out "No" from the setting items for duplex printing.

Further, in the present embodiment, an example is described where a list in which the user can select parameters is arranged on the print setting screen and a restriction is applied by a method of deleting a parameter included in the list. However, the restriction may be applied by a method other than this method. For example, a parameter settable for a function is made selectable by a radio button, and if a restriction is applied, a radio button that cannot be selected from among the radio buttons may be grayed out or not displayed. Further, even if the list is used, if a restriction is applied, a parameter selectable by the user may be grayed out in a selected state. That is, it is sufficient that the user is able to select a function for which selection is forced, is unable to select a function for which non-selection is forced, or is only able to select a specific parameter.

Further, in the present embodiment, the group policy is stored in the registry using an Active Directory function, and is applied from the server device 10 to the terminal device 20. However, the setting may be applied from the server device 10 to the terminal device 20 by a method other than the above method. That is, any technique may be used as long as the first function and the second function are set in the server device 10 and can be applied to the terminal device 20. For example, a setting file or a data stream indicating the first function and the second function may be transmitted from the server device 10 to the terminal device 20.

Further, in the above-described embodiment, a case is described where the information processing device is applied to the terminal device. However, the information processing device may be applied to the image forming apparatus. For example, the first function and the second function may be set for the image forming apparatus 30, the print setting screen may be displayed on an operation panel, and a process similar to the print setting display process illustrated in FIG. 10 may be executed. Further, after receiving the print setting information from the terminal device 20, the image forming apparatus 30 may execute the processing of steps S166 to S170. That is, if the second function is selected as the print setting information, the image forming apparatus 30 may release the restriction on the first function and execute a process based on the second function.

According to the present embodiment, a restriction can be released if the second function is selected, even for a function that could originally not be selected if the first function is restricted. The second function, which originally could not be selected due to the restriction of the first function, can be selected, and thus, the user can select any one of the first function and the second function.

2. Second Embodiment

Next, a second embodiment will be described. The second embodiment is different from the first embodiment in that the first function is a function different from the duplex printing function. In the present embodiment, the first function will be described as a page aggregation function, and the second function will be described as a poster function. In the present embodiment, FIG. 5 of the first embodiment is replaced with FIG. 16, and FIG. 6 of the first embodiment is replaced with FIG. 17, respectively. It is noted that the same numeral or symbol is attached to the same functional element and process, and description of the duplicated part is omitted.

FIG. 16 illustrates the option definition data 246 of the present embodiment. As illustrated in FIG. 16, if the page aggregation function is selected, the poster function cannot be set, and if the poster function is selected, the page aggregation function cannot be set. That is, the page aggregation function and the poster function cannot be selected at the same time.

FIG. 17 illustrates the restriction definition data 248 of the present embodiment. As illustrated in FIG. 17, if the selection of the page aggregation function is forced, a zoom function, the poster function, and a chapter division function cannot be set. Further, "Page insertion" cannot be selected as a parameter of an overlay-printing method function, and "Long" cannot be selected as a parameter of the document size function.

Figure 18A:
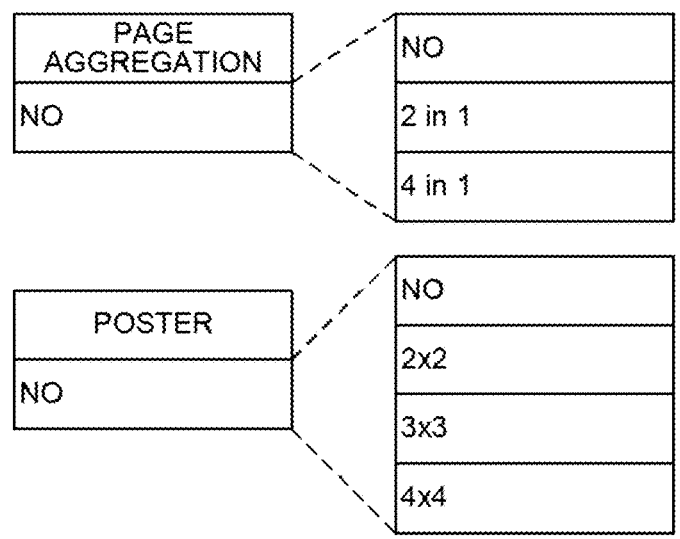
FIG. 18A to FIG. 18C are diagrams each illustrating an example of an operation according to the second embodiment.

The relationship between the setting items of the page aggregation and the poster will be described for such a case with reference to the drawings. FIG. 18A is a diagram illustrating options of the page aggregation function and the poster in a case where neither the first function nor the second function is set. In this case, if the print setting screen W120 is displayed, "No" is selected as the option for the setting items for both page aggregation and poster. Further, the user can select "No" or "Yes" from the setting items of the poster.

Figure 18B:
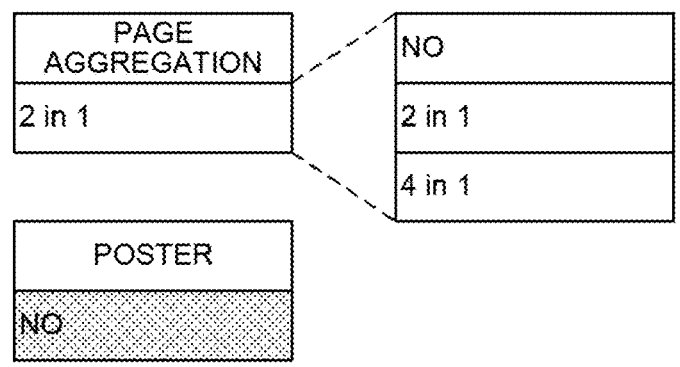
Figure 18C:
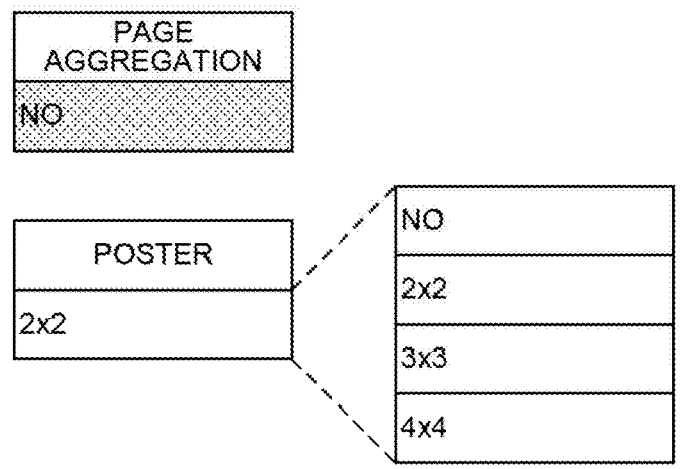

FIG. 18B is a diagram illustrating a state of the setting item of the poster in a case where an option (for example, "2 in 1") indicating the selection of the page aggregation function is selected. The setting item of the poster is grayed out while "No" is selected, and another option cannot be selected. FIG. 18C is a diagram illustrating a state of the setting item of the page aggregation in a case where an option (for example, "2×2") indicating the selection of the poster function is selected. The setting item of the page aggregation is grayed out while "No is selected, and another option cannot be selected.

FIG. 19 is a diagram illustrating a relationship between the setting items for page aggregation and poster in a case where the page aggregation function is set as the first function and the second function is not set. The selection of the page aggregation function is forced, and thus, "No" is deleted from the setting items of the page aggregation. On the other hand, the setting item of the poster is grayed out while "No" is selected and cannot be changed. Therefore, the user cannot select the poster function in conjunction with the restriction that the selection of the page aggregation function is forced.

Figure 20A:
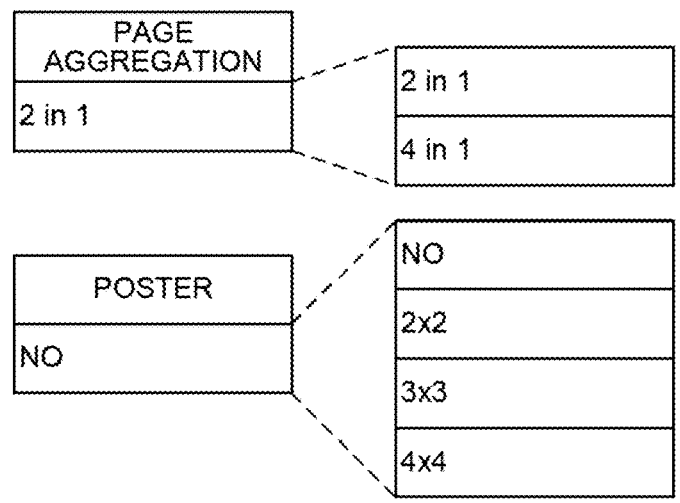
FIG. 20A to FIG. 20C are diagrams each illustrating an example of an operation according to the second embodiment.
Figure 20B:
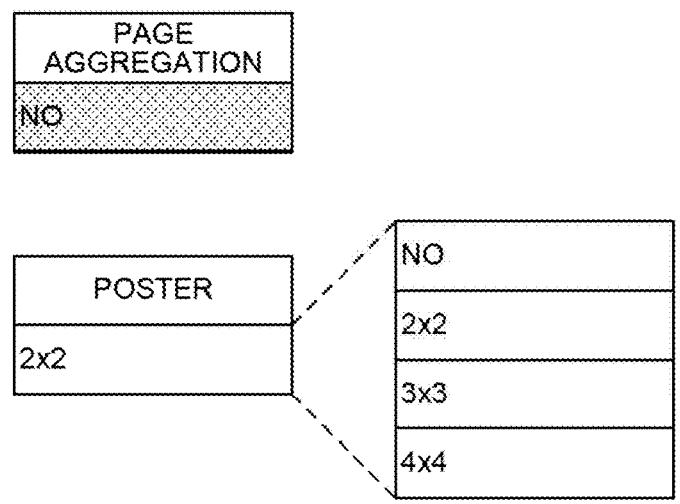
Figure 20C:
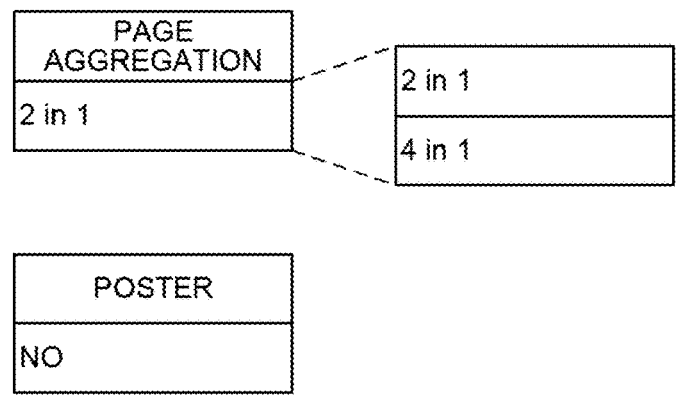

FIG. 20A to FIG. 20C are diagrams illustrating the relationship between the setting items for page aggregation and poster in a case where the selection of the page aggregation function is set as the first function and the poster function is set as the second function. FIG. 20A is a diagram illustrating options for the setting item of the page aggregation and options for the setting item of the poster. Here, the selection of the page aggregation function is forced, and thus, "No" is deleted from the setting items of the page aggregation. On the other hand, the setting of the poster function is permitted, and thus, the setting items of the poster are enabled, and options such as "No" and "2×2" can be selected.

FIG. 20B is a diagram illustrating the setting item for the page aggregation in a case where "2×2" is selected from the setting items of the poster. The selection of the page aggregation function is forced, and thus, "No" can originally not be selected as a setting item for the page aggregation. However, if "2×2" is selected from the setting items of the poster, the deleted option "No" is selected from the setting items of the page aggregation, is grayed out, and cannot be changed.

FIG. 20C is a diagram illustrating a state of the setting item for the page aggregation in a case where "No" is selected from the setting items of the poster. In this case, "No" is deleted from the setting items of the page aggregation, and any one of "2 in 1" or "4 in 1" can be selected. In this way, if the poster function is not selected, the selection of the page aggregation function is forced.

It is noted that, in the above description, the first function is described as the page aggregation function, and the second function is described as the poster function. However, the second function may be a function different from the poster function. For example, as illustrated in FIG. 17, if the selection of the page aggregation function is forced, the zoom function and the like are restricted. In such a case, if the zoom function is set as the second function and the user selects the zoom function, the controller 200 only needs to select and gray out "No" from the setting items of the page aggregation.

According to the present embodiment, even if a function other than a page printing function is set as the first function, a restriction can be released if the second function is selected.

3. Third Embodiment

Next, a third embodiment will be described. The third embodiment is different from the first embodiment in that if the restriction of the first function is released by selecting the second function, it is possible to select whether the restricted function is selected. In the present embodiment, FIG. 10 of the first embodiment is replaced with FIG. 21. It is noted that the same numeral or symbol is attached to the same functional element and process, and description of the duplicated part is omitted.

A print setting screen display process according to the present embodiment will be described with reference to FIG. 21. In the present embodiment, if determining that the option has been changed in step S164, the controller 200 determines whether the second function is selected (step S164; Yes to step S166).

If the second function is selected, the controller 200 releases the restriction on the first function (step S166; Yes to Step S168). For example, the controller 200 adds the option deleted in step S156. It is noted that, unlike the first embodiment, in the present embodiment, the controller 200 does not execute a process of selecting the option added in step S168 or making the option unchangeable. In this way, it is possible to set whether the user selects the first function.

On the other hand, if the second function is not selected, the setting items corresponding to the first function are restricted by a process similar to step S156 (step S166; No to step S172). In this manner, the release of the restriction by the process in step S168 is canceled.

A specific example will be described with reference to the drawings. As the specific example, the first function is assumed to be a color mode function, and the content of the restriction is to force the selection of "monochrome" as a parameter. Further, the second function is assumed to be a function "output sheet of postcard size".

Figure 22:
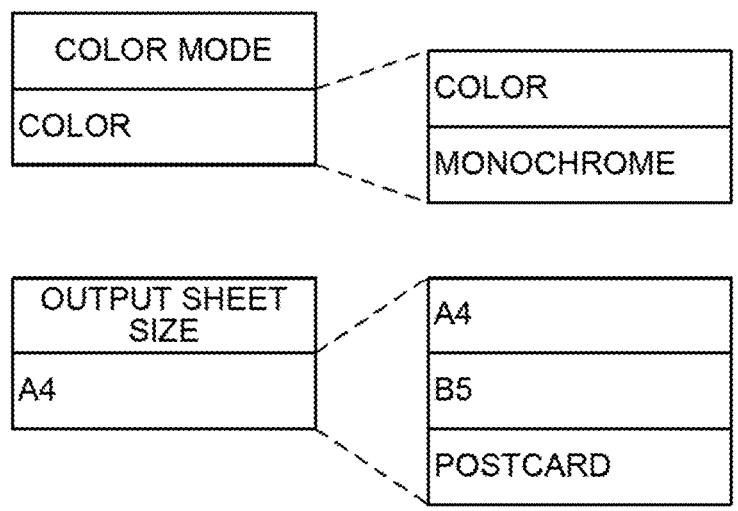
FIG. 22 is a diagram illustrating an example of an operation according to the third embodiment.

FIG. 22 is a diagram illustrating options for the setting item of the color mode and the setting item of the output sheet size in a case where neither the first function nor the second function is set. As illustrated in FIG. 22, "monochrome" or "color" can be selected from the setting items of the color mode. Further, "A4", "B5", and "postcard" can be selected from the setting items of the output sheet size.

FIGS. 23A to 23C illustrate options for the setting item of the color mode and the setting item of the output sheet size in a case where the first function is set to the color mode function and the second function is set to a function "output sheet of postcard size".

FIG. 23A is a diagram illustrating a case where "A4" is selected as the setting item of the output sheet size. At this time, the function "output sheet of postcard size", being the second function, is not selected, and thus, a parameter other than "monochrome", that is, an option corresponding to "color" is deleted from the color modes that are selection items corresponding to the first function. Therefore, if the output sheet size is A4, colored output is not possible for the user.

FIG. 23B is a diagram illustrating a case where "B5" is selected as the setting item of the output sheet size. Also at this time, the function "output sheet of postcard size", being the second function, is not selected, and thus, "color" is deleted from the color modes that are selection items corresponding to the first function.

FIG. 23C is a diagram illustrating a case where "postcard" is selected as the setting item of the output sheet size. At this time, the function "output sheet of postcard size" being the second function is selected, and thus, the restriction on the first function is released. Specifically, an option corresponding to a parameter other than "monochrome", that is, "color" is added to the setting items of the color mode. As a result, the user can select "color" or "monochrome" from the setting items of the color mode.

According to the present embodiment, the user can release the restricted function by selecting a predetermined function, and can further select whether to select the restricted function.

4. Modification

The present invention is not limited to the above embodiments, and can have various modifications. That is, embodiments obtained by combining technical features appropriately changed within the scope not departing from the gist of the present invention are also included in the technical scope of the present invention.

Further, although the above-described embodiments have portions described separately for convenience of description, it is needless to say that the embodiments may be combined and executed within a technically possible range.

In addition, a program operating in each of the devices in the embodiments is a program (a program for making a computer function) that controls a CPU and the like to realize the functions of the above-described embodiments. Information processed by these devices is temporarily stored in a temporary storage device (such as a random-access memory (RAM)) at the time of processing the information, and then stored in storage devices such as various types of read only memories (ROMs) and HDD, and read, or corrected/written by the CPU as necessary.

Here, examples of a recording medium for storing the program can include a semiconductor medium (such as a ROM and a non-volatile memory card), an optical recording medium/magneto-optical recording medium (such as a digital versatile disc (DVD), a magneto optical disc (MO), a mini disc (MD), a compact disc (CD), and a Blu-ray Disc (BD) (registered trademark)), and a magnetic recording medium (such as magnetic tape and a flexible disk). In addition to a case the functions of the above-described embodiments are realized by executing the loaded program, there may be a case where the functions of the present invention are realized as a result of processing that based on the instructions of the program and is performed in cooperation with an operating system, another application program, or the like.

In addition, when being distributed to the market, the program can be stored and distributed in a portable recording medium, or transferred to a server computer connected via a network such as the Internet. In this case, of course, a storage device of the server computer is also included in the present invention.

DESCRIPTION OF REFERENCE NUMERALS

1 Printing system
10 Server device
100 Controller
110 Display
120 Operation inputter
130 Communicator
140 Storage
142 Registry data
144 Group Policy Change Program
146 Group Policy Application Program
20 Information processing device
200 Controller
210 Display
220 Operation inputter
230 Communicator
240 Storage
242 Registry data
244 Printer driver
246 Option definition data
248 Restriction definition data
30 Image forming apparatus
300 Controller
310 Image inputter
320 Image processor
330 Image former
340 Display
350 Operation inputter
360 Communicator
370 Storage
372 Image data storage area
374 Print setting information storage area

What is claimed is:

1. An information processing device connected to a device that executes a printing process in accordance with an option selected by a user, the information processing device comprising:

a setter that sets selectable options for each setting item of a plurality of the setting items,
an identifier that identifies a first setting item and a second setting item from the plurality of the setting items; and
a restrictor that restricts a selectable option for the first setting item, wherein
the restrictor releases a restriction on the first setting item if the user selects a specific option from the selectable options for the second setting item.

2. The information processing device according to claim 1, wherein the first setting item is in conjunction with the second setting item.

3. The information processing device according to claim 1, wherein the restrictor performs restriction so that the user cannot select one or more options from the first setting item.

4. The information processing device according to claim 3, wherein the restrictor selects a restricted option for the first setting item if the user selects the specific option from the second setting item.

5. The information processing device according to claim 3, wherein if the user selects the specific option from the second setting item, the restrictor enables selection of a restricted option for the first setting item.

6. The information processing device according to claim 1, wherein the restrictor performs restriction so that the user can only select a predetermined option for the first setting item.

7. The information processing device according to claim 1, wherein the restricted option of the first setting item is a single-sided printing function and the specific option in the second setting item is a booklet making function.

8. A control method of an information processing device connected to a device that executes a printing process in accordance with an option selected by a user, the control method comprising:
setting selectable options for each setting item of a plurality of the setting items;
identifying a first setting item and a second setting item from the plurality of setting items; and
restricting a selectable option for the first setting item, wherein
in the restricting, the restriction on the first setting item is released if the user selects a specific option from the selectable options for the second setting item.

9. A non-transitory computer-readable storage medium that stores a program of an information processing device connected to a device that executes a printing process in accordance with an option selected by a user, the program causing a computer to perform:
setting selectable options for each setting item of a plurality of the setting items;
identifying a first setting item and a second setting item from the plurality of setting items; and
restricting a selectable option for the first setting item, wherein
the restricting function releases the restriction on the first setting item if the user selects a specific option from the options for the second setting item.

* * * * *